United States Patent [19]
Brutscher et al.

[11] Patent Number: 5,569,001
[45] Date of Patent: Oct. 29, 1996

[54] TEMPLATE USED IN INSTALLING DOOR LOCKS

[75] Inventors: David T. Brutscher, Louisville; Leroy R. Leet, Sr., Shelbyville, both of Ky.

[73] Assignee: Credo Tool Company, Woodburn, Oreg.

[21] Appl. No.: 490,239

[22] Filed: Jun. 14, 1995

[51] Int. Cl.⁶ ................................ B23B 49/02
[52] U.S. Cl. .................. 408/115 R; 33/638; 33/644; 408/72 R
[58] Field of Search .............. 408/72 R, 72 B, 408/115 R, 115 B; 33/613, 626, 630, 638, 644, 574

[56] References Cited

U.S. PATENT DOCUMENTS

| | | | |
|---|---|---|---|
| 2,679,174 | 5/1954 | Schlage | 408/115 R |
| 2,804,788 | 9/1957 | Humphrey | 408/115 R |
| 2,838,966 | 6/1958 | Campbell | 408/115 R |
| 3,008,359 | 11/1961 | Mackey | 408/115 R |
| 4,280,776 | 7/1981 | Chaconas et al. | 408/72 |
| 4,331,411 | 5/1982 | Kessinger et al. | 408/115 R |
| 4,445,277 | 5/1984 | Keefe | 408/115 R |
| 4,893,970 | 1/1990 | Becraft | 408/72 |
| 5,116,170 | 5/1992 | Palmer et al. | 408/72 |
| 5,222,845 | 6/1993 | Goldstein et al. | 408/103 |

FOREIGN PATENT DOCUMENTS 3020970  12/1981  Germany ................ 408/115 B

OTHER PUBLICATIONS

Porter–Cable model 511 cylindrical lock boring jig catalog, page, other info unknown.

*Primary Examiner*—Steven C. Bishop
*Attorney, Agent, or Firm*—Middleton & Reutlinger; James C. Eaves, Jr.

[57] ABSTRACT

A template used in installing door locks. A side bracket is slidably received by a front bracket and the two brackets are aligned for the door width or thickness of the door to be drilled. The template permits properly related pilot holes to be drilled into the door edge using the side bracket and the door face using the front bracket.

19 Claims, 3 Drawing Sheets

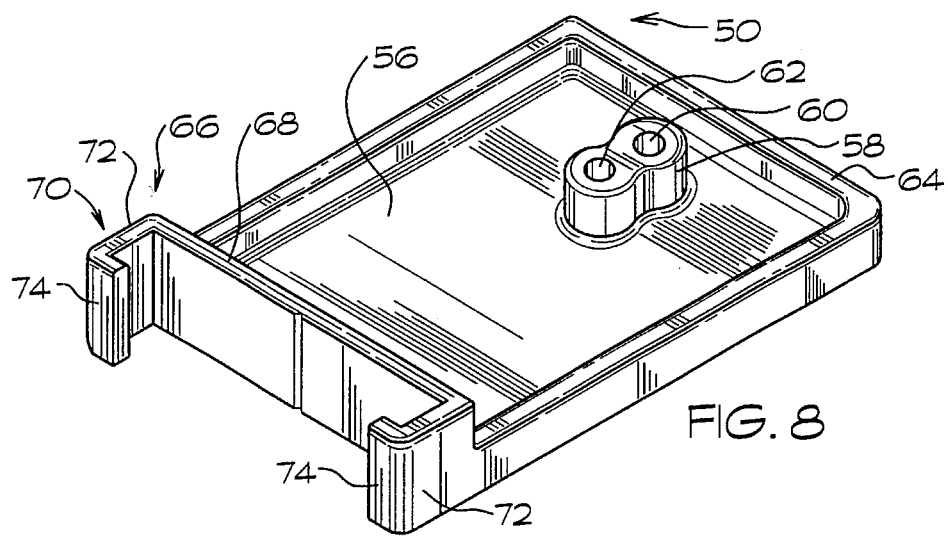
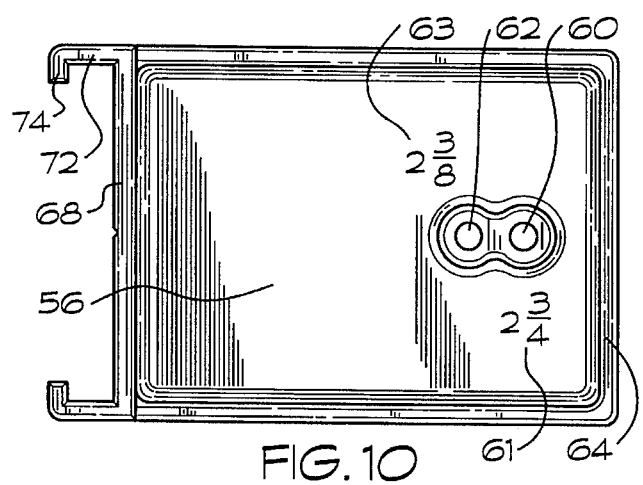
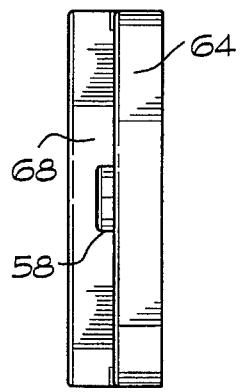
FIG. 9  FIG. 10  FIG. 11
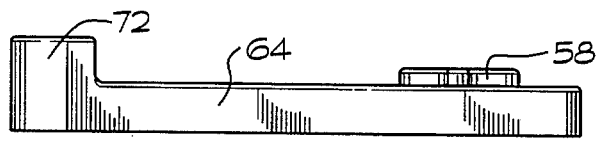
FIG. 12
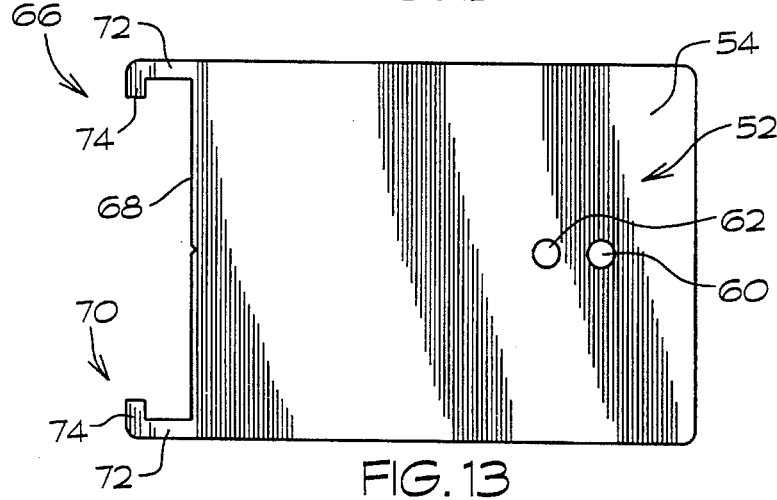
FIG. 13

TEMPLATE USED IN INSTALLING DOOR LOCKS

BACKGROUND OF THE INVENTION

1. Field of the Invention

The present invention relates to a template used in installing door locks. A side bracket is slidably received by a front bracket and the two brackets are aligned for the door width or thickness of the door to be drilled. The template permits properly related pilot holes to be drilled into the door edge using the side bracket and the door face using the front bracket.

2. Description of the Prior Art

Porter-Cable produces a model 511 lock installation kit having a jig which has an adjustment for selecting either a 2⅜" or 2¾" back set. The jig clamps onto a door having a thickness of from 1 5/16" to 2⅛". A thumbscrew is used to center the bushing for drilling a 1" bore on the door jamb center line. Pilot holes are not drilled. The jig has drill guides for directly drilling the 1" diameter door jamb bore and the 2⅛" diameter door edge through bore.

Goldstein et al., U.S. Pat. No. 5,222,845, teaches a drill guide apparatus having a generally U-shaped member which is clamped to a door at a desired location. Leg 20, which abuts the door jamb, has an elongate drill guide bushing 60 located a specific distance "T/2" from perpendicular leg 32, "T" being the thickness of the door. Therefore, each apparatus 10 will only function with a door of a specific thickness.

Palmer et al., U.S. Pat. No. 5,116,170, teaches a drill jig for preparing a door to receive a cylindrical lock. Becraft, U.S. Pat. No. 4,893,970, teaches an unadjustable hand held drill guide for drilling two perpendicular dowel receiving bores in a workpiece. Chaconas et al., U.S. Pat. No. 4,280,776, teaches an apparatus for installation of a door lockset.

SUMMARY OF THE INVENTION

The present invention is for a template used in installing door locks. More particularly, the present invention permits the drill guide side bracket and front bracket to be slidably oriented for a specific door thickness and secured or held to the door at a proper height. The centered drill guide hole in the side bracket piece is used to drill a pilot hole into the end of the door or door jamb along the door center line. The two holes on the front bracket are spaced 2⅜" and 2¾" from the side bracket piece. For most locks, these are the two standard back set possibilities. Using the appropriate front bracket hole for the lock to be installed, a pilot hole is drilled. After the two pilot holes are drilled, the template is removed and, using these two pilot holes, the larger holes for receiving the lock components are drilled.

More particularly, the present invention comprises a template for use as a guide to drill two perpendicular holes into a door, having: a side bracket having a door edge engaging portion having a door edge flat face and a door edge opposed face, the door edge engaging portion having two opposed parallel sides, the door edge engaging portion having a door edge bore therethrough, the door edge bore having a door edge bore axis transverse to the door edge flat face; a front bracket having a door face engaging portion and means for slidably receiving the side bracket, the door face engaging portion having a door face flat face and a door face opposed face, the door face engaging portion having at least one door face bore therethrough, the at least one door face bore having a door face bore axis transverse to the door face flat face; the two opposed parallel sides of the door edge engaging portion of the side bracket being slidably received by the means for slidably receiving the side bracket of the front bracket, the door edge flat face and the door face flat face being in a transverse relationship, the door edge bore axis being parallel the door face flat face and slidably adjustable to a desired spaced distance therefrom, the at least one door face bore axis being parallel the door edge flat face and a preselected distance therefrom.

Even further, where the two opposed parallel sides have a width therebetween and where each of the two opposed parallel sides having a common thickness, the means for slidably receiving the side bracket can include a slide lip and a receiving portion, the slide lip and the door face bore axis being in a parallel relationship, the receiving portion including a pair of parallel portions extending transverse from the slide lip, the pair of parallel portions being spaced apart a first distance, the first distance having a first value approximately equal to the width, the receiving portion further including a pair of inward directed portions, each of the parallel portions terminating in one of the inward directed portions, the inward directed portions being transverse to the parallel portions and parallel to the slide lip, the inward directed portions being spaced from the slide lip a second distance, the second distance having a second value approximately equal to the common thickness.

Finally, where the door has a specified thickness, the side bracket can includes means for identifying that the desired spaced distance between the door edge bore axis and the door face flat face has a value approximately equal one-half of the specified door thickness.

BRIEF DESCRIPTION OF THE DRAWINGS

A better understanding of the present invention will be had upon reference to the following description in conjunction with the accompanying drawings, wherein:

FIG. 8 is a perspective view of the front bracket of the template of FIG. 1;

FIG. 9 is a right end view of the front bracket of FIG. 8;

FIG. 10 is a front plan view of the front bracket of FIG. 8;

FIG. 11 is a left end view of the front bracket of FIG. 8;

FIG. 12 is a bottom end view of the front bracket of FIG. 8; and,

FIG. 13 is a back plan view of the front bracket of FIG. 8.

DETAILED DESCRIPTION OF THE PREFERRED EMBODIMENT

Figure 1:
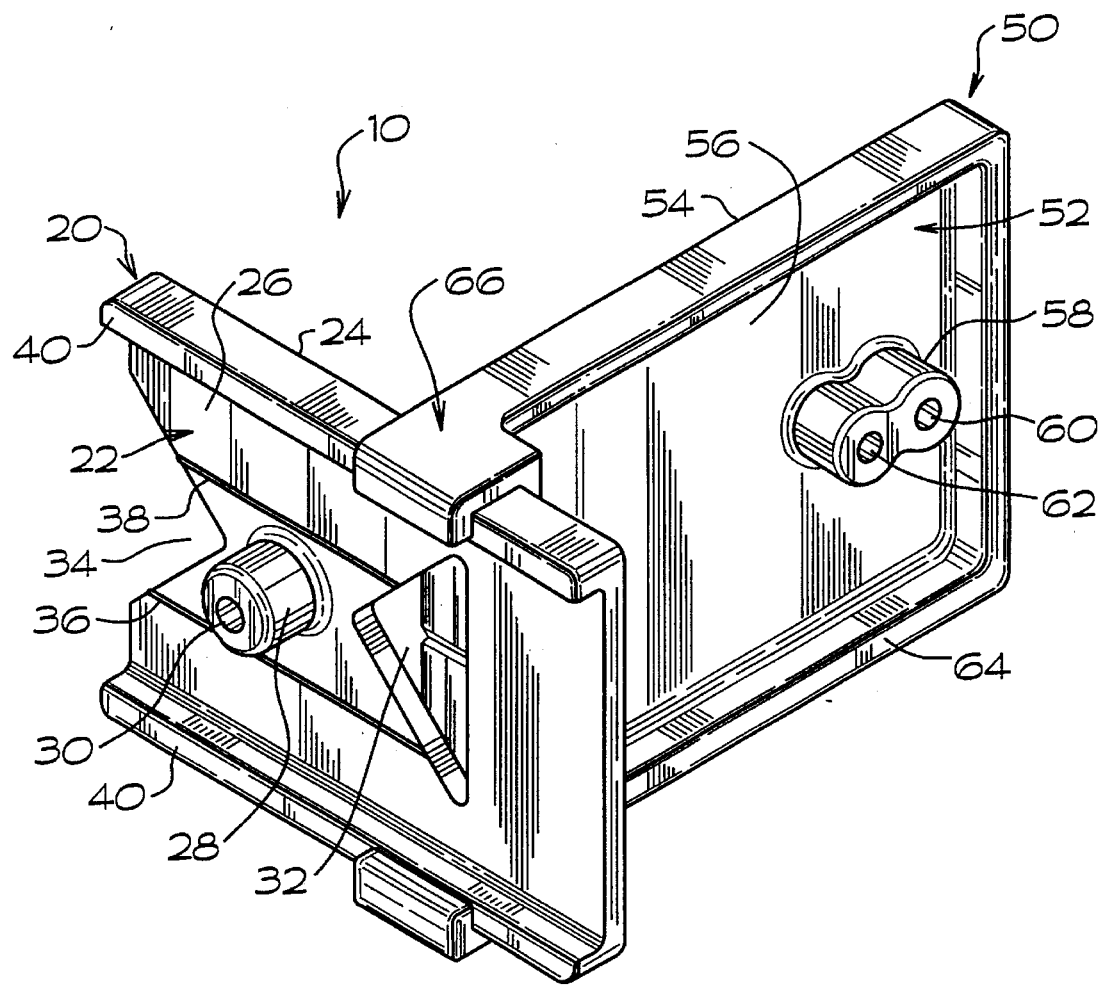
FIG. 1 is a front left side elevational perspective view of a template used in installing door locks.
Figure 2:
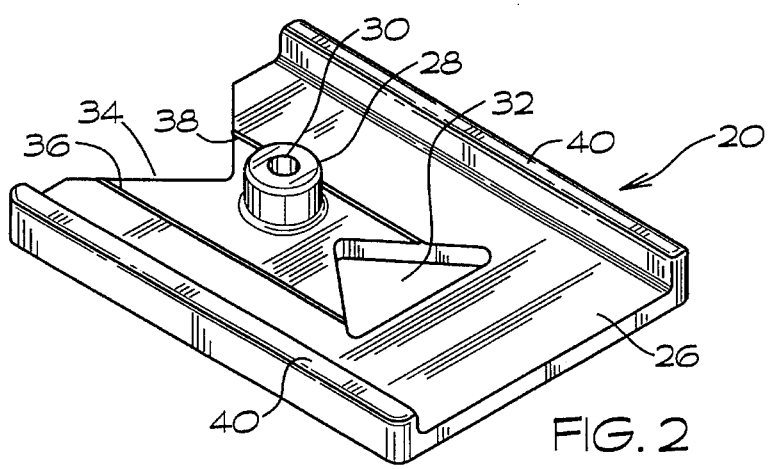
FIG. 2 is a perspective view of the side bracket of the template of FIG. 1.
Figure 3:
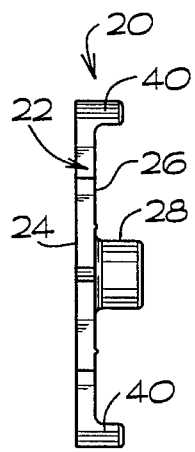
FIG. 3 is a right end view of the side bracket of FIG. 2.
Figure 4:
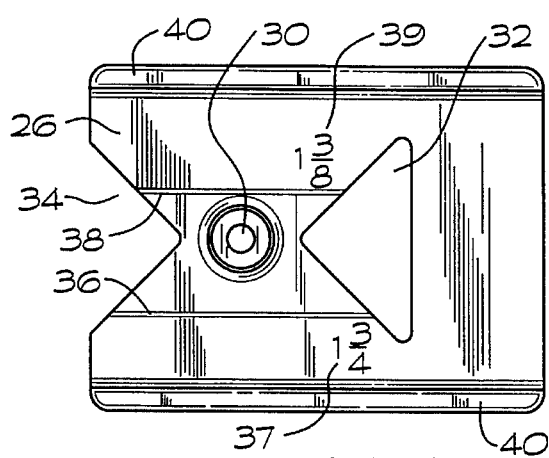
FIG. 4 is a front plan view of the side bracket of FIG. 2.
Figure 5:
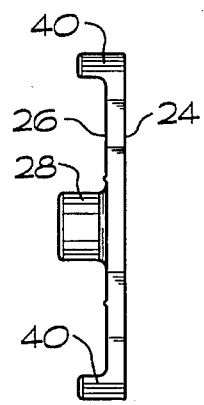
FIG. 5 is a left end view of the side bracket of FIG. 2.
Figure 6:
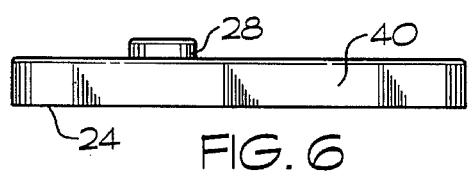
FIG. 6 is a bottom end view of the side bracket of FIG. 2.
Figure 7:
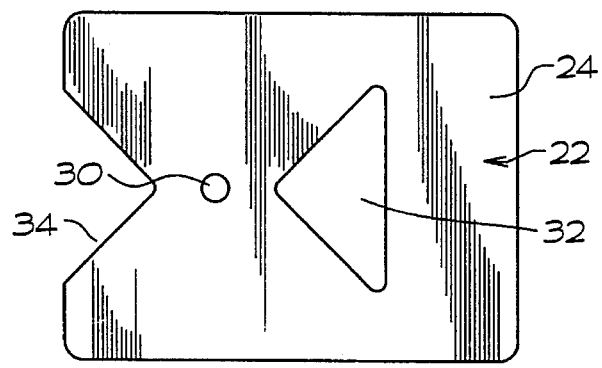
FIG. 7 is a back plan view of the side bracket of FIG. 2.

With reference to the Figures, FIG. 1 shows the template 10 having a side bracket 20 and a front bracket 50. FIGS. 2–7 provide detail on the side bracket 20 and FIGS. 8–13 provide detail on the front bracket 50. The brackets 20/50 are preferably plastic and injection molded.

Side bracket 20 is shown having a door edge engaging portion 22 having a pair of parallel opposed rails 40 therealong. Portion 22 has a flat face 24, which engages the door edge, and an opposed face 26. Face 26 has a central raised portion 28 having a bore 30 therethrough, bore 30 having an axis perpendicular to face 24 and extending through bracket 20.

Side bracket 20 is to be placed on the door edge so that bore 30 is at about the door edge midpoint. To facilitate this placement, a triangular opening 32 and opposed triangular indentation 34 are provided through bracket 20. A first door thickness guide line 36 and a second door thickness guide line 38 are provided. For example, with particular reference to FIG. 4, guide line 36 has a length of 1¾ inch, which can be designated on bracket 20 as indicia 37. Further, guide line 38 has a length of 1⅜ inch, which can be designated on bracket 20 as indicia 39. These lengths were selected because these are two standard door widths. In use, for example with a vertically mounted door 1¾ inch wide, bracket 20 will be placed against the door edge, line 36 will be horizontal and the end of line 36 at triangle 32 and the end of line 36 at triangle 34 will align with the intersection of the door edge with the two door faces. The end of line 36 at triangle 32 terminates at and is perpendicular to a plane extending from front bracket 50's flat face 54, explained hereinafter.

Front bracket 50 is shown having a door face engaging portion 52 and a C-shaped side bracket receiving portion 66. Portion 52 has a flat face 54, which engages a door face, and an opposed face 56. Face 56 has a raised portion 58 having a first bore 60 therethrough, bore 60 having an axis perpendicular to face 54 and extending through bracket 50. Raised portion 58 can also have a second bore 62 therethrough, bore 62 would also have an axis perpendicular to face 54 and extend through bracket 50. Bores 60/62 are used to drill a pilot hole for the lock back set. Two bores 60/62 are provided for the general 2⅜" or 2¾" back set. When side bracket 20 is received into bracket receiving portion 66, the distance from bore 60 to flat face 24 is 2¾", as may be indicated by indicia 61, shown in FIG. 10. Likewise, the distance from bore 62 to flat face 24 is 2⅜", as may be indicated by indicia 63, also shown in FIG. 10. A lip 64 is provided.

C-shaped side bracket receiving portion 66 provides means for slidably receiving bracket 20 therein and retaining faces 24 and 54 in a transverse relationship. Portion 66 has a slide lip 68 on which face 24 will slide. Rail receiving channels 70 extend from lip 68 away from bores 60/62. Channels 70 have parallel portions 72 extending transverse from lip 68 and inward portions 74 which point at each other to complete the channels 70 which will slidably receive rails 40 of bracket 20.

As shown in FIG. 1, brackets 20/50 of template 10 are aligned for use on a 1⅜ inch thick door, bracket 20 being received by portion 66 so that the end of line 38 in triangular opening 32 intersects a planar extension of flat face 54. Template 10 is placed on the door at a desired height and pilot holes drilled using bore 30 and either bore 60 or 62, depending on the required back set. Template 10 is removed and the pilot holes are used as guides for drilling the larger holes which receive the lock components.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A template for use as a guide to drill two perpendicular holes into a door, comprising:

a. a side bracket, said side bracket having a door edge engaging portion, said door edge engaging portion having a door edge flat face and a door edge opposed face, said door edge engaging portion having two opposed parallel external sides, said door edge engaging portion having a door edge bore therethrough, said door edge bore having a door edge bore axis transverse to said door edge flat face;

b. a front bracket, said front bracket having a door face engaging portion and means for slidably receiving said two opposed parallel external sides of said side bracket, said door face engaging portion having a door face flat face and a door face opposed face, said door face engaging portion having at least one door face bore therethrough, said at least one door face bore having a door face bore axis transverse to said door face flat face;

c. said two opposed parallel external sides of said door edge engaging portion of said side bracket being slidably received by said means for slidably receiving said side bracket of said front bracket, said door edge flat face and said door face flat face being in a transverse relationship, said door edge bore axis being parallel to said door face flat face and slidably adjustable to a desired spaced distance therefrom, said at least one door face bore axis being parallel to said door edge flat face and a preselected distance therefrom.

2. The template of claim 1, where said two opposed parallel external sides have a width therebetween, each of said two opposed parallel external sides having a common thickness, and where said means for slidably receiving said side bracket include a slide lip and a receiving portion, said slide lip and said door face bore axis being in a parallel relationship, said receiving portion including a pair of parallel portions extending transverse from said slide lip, said pair of parallel portions being spaced apart a first distance, said first distance having a first value approximately equal to said width, said receiving portion further including a pair of inward directed portions, each of said parallel portions terminating in one of said inward directed portions, said inward directed portions being transverse to said parallel portions and parallel to said slide lip, said inward directed portions being spaced from said slide lip a second distance, said second distance having a second value approximately equal to said common thickness.

3. The template of claim 1, where said means for slidably receiving said side bracket comprises a C-shaped bracket receiving assembly.

4. The template of claim 1, where each of said two opposed parallel external sides have a rail portion, said rail portion being transverse to said door edge flat face.

5. The template of claim 1, where said door has a thickness and where side bracket includes means for identifying that said desired spaced distance between said door edge bore axis and said door face flat face has a value approximately equal one-half of said thickness of said door.

6. The template of claim 5, where said identifying means comprises: a pair of opposed triangular openings having parallel bases, said triangular openings having vertices which are in an aligned relationship with said door edge bore, said vertices being equally spaced from said door edge bore, said triangular openings having at least one door thickness line therebetween, said at least one door thickness line being transverse to said parallel bases.

7. The template of claim 6, where said at least one door thickness line comprises a first and a second door thickness line.

8. The template of claim 6, where said door has a thickness and where said at least one door thickness line includes indicia indicative of said thickness of said door.

9. The template of claim 7, where said first door thickness line has a first length equal to 1¾ inch and where said second door thickness line has a second length equal to 1 ⅜ inch.

10. The template of claim 1, where said side bracket door edge opposed face has a central raised portion, said central raised portion including said door edge bore, and where said front bracket door face opposed face has a raised portion, said raised portion including said at least one door face bore.

11. The template of claim 1, where said at least one door face bore includes a first door face bore and a second door face bore, said first door face bore having a first door face bore axis and said second door face bore having a second door face axis, said first door face bore axis being a first preselected distance from said door edge flat face and said second door face bore axis being a second preselected distance from said door edge flat face.

12. The template of claim 11, where first preselected distance is 2¾ inch and said second preselected distance is 2⅜ inch.

13. The template of claim 11, where said front bracket includes indicia identifying said first and said second preselected distances.

14. The template of claim 2, where said door has a thickness and where side bracket includes means for identifying that said desired spaced distance between said door edge bore axis and said door face flat face has a value approximately equal one-half of said thickness of said door.

15. The template of claim 14, where said identifying means comprises: a pair of opposed triangular openings having parallel bases, said triangular openings having vertices which are in an aligned relationship with said door edge bore, said vertices being equally spaced from said door edge bore, said triangular openings having at least one door thickness line therebetween, said at least one door thickness line being transverse to said parallel bases.

16. The template of claim 15, where said at least one door thickness line comprises a first and a second door thickness line.

17. The template of claim 2, where said at least one door face bore includes a first door face bore and a second door face bore, said first door face bore having a first door face bore axis and said second door face bore having a second door face axis, said first door face bore axis being a first preselected distance from said door edge flat face and said second door face bore axis being a second preselected distance from said door edge flat face.

18. The template of claim 14, where said at least one door face bore includes a first door face bore and a second door face bore, said first door face bore having a first door face bore axis and said second door face bore having a second door face axis, said first door face bore axis being a first preselected distance from said door edge flat face and said second door face bore axis being a second preselected distance from said door edge flat face.

19. The template of claim 2, where said side bracket door edge opposed face has a central raised portion, said central raised portion including said door edge bore, and where said front bracket door face opposed face has a raised portion, said raised portion including said at least one door face bore.

* * * * *